(12) United States Patent
Chen

(10) Patent No.: US 7,440,198 B2
(45) Date of Patent: Oct. 21, 2008

(54) FOCUS ADJUSTABLE OPTICAL SYSTEM

(75) Inventor: Shih-Han Chen, Taipei County (TW)

(73) Assignee: Genius Electronic Optical Co. Ltd., Taichung (TW)

( * ) Notice: Subject to any disclaimer, the term of this patent is extended or adjusted under 35 U.S.C. 154(b) by 0 days.

(21) Appl. No.: 11/739,203

(22) Filed: Apr. 24, 2007

(65) Prior Publication Data

US 2008/0174879 A1    Jul. 24, 2008

(51) Int. Cl.
G02B 9/34 (2006.01)
(52) U.S. Cl. ................ 359/771; 359/772; 359/773
(58) Field of Classification Search ............. 359/771, 359/772, 773, 779, 780, 782, 784, 686, 689
See application file for complete search history.

(56) References Cited

U.S. PATENT DOCUMENTS

| | | | | |
|---|---|---|---|---|
| 7,072,119 B2* | 7/2006 | Kawasaki | | 359/659 |
| 7,079,327 B2* | 7/2006 | Takatsuki | | 359/686 |
| 7,218,457 B2* | 5/2007 | Sensui | | 359/686 |

* cited by examiner

Primary Examiner—Timothy J Thompson
(74) Attorney, Agent, or Firm—Browdy and Neimark, P.L.L.C.

(57) ABSTRACT

A focus adjustable optical system includes a first lens unit and a second lens unit arranged on an optical axis in direction from the object side to the image side. The two opposite surfaces of each of the lenses of the first lens unit and second lens unit are non-spherical surfaces. Each lens of the first lens unit defines with the image side a fixed distance. The second lens unit has one lens movable by a low-power small-sized driving source along the optical axis to adjust its distance relative to the image side and to further adjust the focal distance while the distance between the first lens unit and the image plane remains unchanged.

10 Claims, 16 Drawing Sheets

US 7,440,198 B2

FOCUS ADJUSTABLE OPTICAL SYSTEM

BACKGROUND OF THE INVENTION

1. Field of the Invention

The present invention relates to an optical system and more particularly, to a focus adjustable optical system.

2. Description of the Related Art

In the domain of photography, image-forming lenses of early design commonly have a fixed focus. These image-forming lenses are called fixed focal lenses. However, these fixed focal lenses have a small range of depth of field. During close-up photographing or telephotographing or when the distance between the lens and the object is changed, the object may extend out of the range of depth of field, resulting in a vague image.

In view of the aforesaid problem, auto focal lenses are developed that can automatically adjust the focus to obtain a great range of depth of field. Regular auto focus lens designs achieve auto focus function by moving the whole lens system relative to the CCD (charge-coupled device) or CMOS (complementary metal-oxide semiconductor) image sensor. Because a driving source is necessary to move the whole lens system relative to the CCD (charge-coupled device) or CMOS (complementary metal-oxide semiconductor) image sensor, a big installation space is necessary for accommodating the lens system and the driving source and allowing movement of the lens system. For moving the whole lens system, a high-power driving source shall be used. A high-power driving source for this purpose has a relatively heavy weight. The use of such a high-power and big-sized driving source cannot satisfy the consumers' demand for a small-sized high quality design.

SUMMARY OF THE INVENTION

The present invention has been accomplished under the circumstances in view. It is one object of the present invention to provide a focus adjustable optical system, which greatly reduces the length and dimensions of the whole assembly to satisfy market demand for small-sized designs.

To achieve this and other objectives of the present invention, the invention provides a focus adjustable optical system, which is comprised of a first lens unit and a second lens unit arranged in proper order along an optical axis between the object side and the image side. The first lens unit comprises at least one lens, which defines with the image plane a fixed distance. The two opposite surfaces of each lens of the first lens unit that face the object side and the image side respectively are non-spherical surfaces. The second lens unit comprises at least one lens that is movable along the optical axis to change its distance relative to the image plane. The two opposite surfaces of each lens of the second lens unit that face the object side and the image side respectively are non-spherical surfaces.

As an alternate form of the present invention, the focus adjustable optical system is comprised of a first lens unit, a second lens unit, and a third lens unit. The first lens unit comprises at least one lens, which defines with the image plane a fixed distance. The two opposite surfaces of each lens of the first lens unit that face the object side and the image side respectively are non-spherical surfaces. The second lens unit comprises at least one lens, which is movable along the optical axis to change its distance relative to the image side. The two opposite surfaces of each lens of the second lens unit that face the object side and the image side respectively are non-spherical surfaces. The third lens unit is comprised of at least one lens, which defines with the image side a fixed distance. The two opposite surfaces of each lens of the third lens unit are non-spherical surfaces.

DETAILED DESCRIPTION OF THE INVENTION

Figure 1:
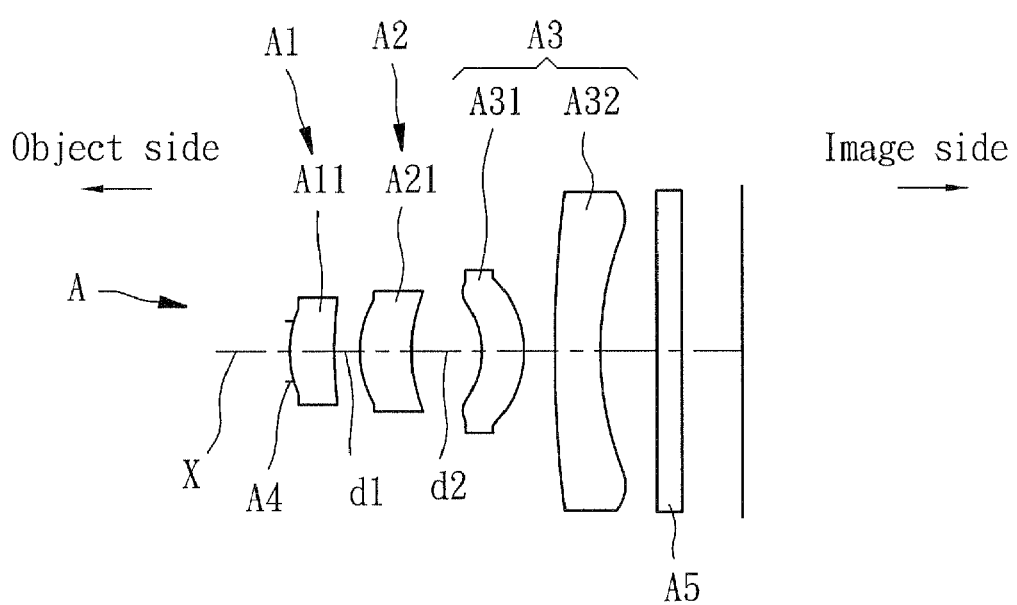
FIG. 1 is a schematic drawing showing the structure of a focus adjustable optical system in accordance with a first embodiment of the present invention.
Figure 2:
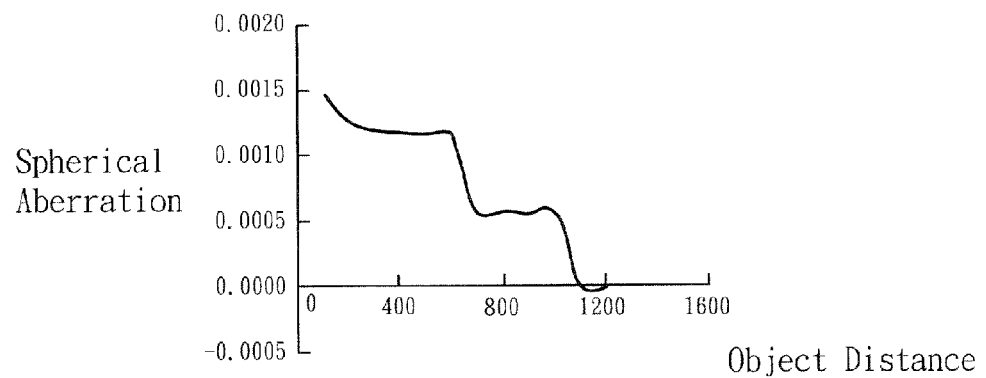
FIG. 2 is a spherical aberration curve obtained from the focus adjustable optical system in accordance with the first embodiment of the present invention.
Figure 3:
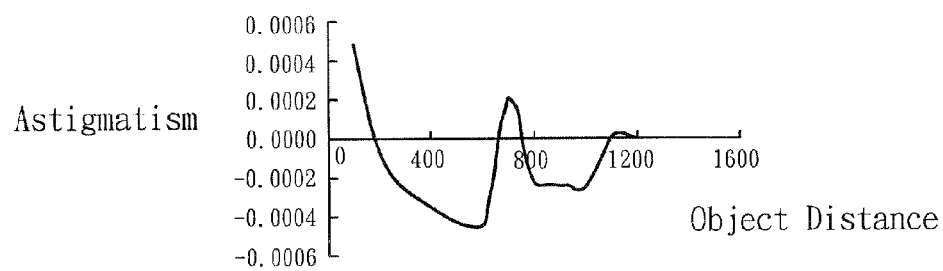
FIG. 3 is an astigmatism curve obtained from the focus adjustable optical system in accordance with the first embodiment of the present invention.

Referring to the annexed drawing of FIGS. 1-3, a focus adjustable optical system A in accordance with a first embodiment of the present invention is shown comprising a first lens unit A1, a second lens unit A2, and a third lens unit A3. The first lens unit A1, the second lens unit A2 and the third lens unit A3 are arranged in proper order from the object side to the image side along an optical axis X.

The first lens unit A1 is comprised of a first lens A11 having a positive diopter. The surfaces of the first lens A11 that face the object side and the image side respectively are non-spherical surfaces. Further, a diaphragm A4 is provided at the surface of the first lens A11 facing the object side.

The second lens unit A2 is comprised of a second lens A21 having a negative diopter. The surfaces of the second lens A21 that face the object side and the image side respectively are non-spherical surfaces.

The third lens unit A3 is comprised of a third lens A31 having a positive diopter and a fourth lens A32 having a negative diopter. The surfaces of the third lens A31 and fourth lens A32 that face the object side and the image side respectively are non-spherical surfaces.

When the object distance is changed from infinity to close shot, an auto focus function is performed in the focus adjustable optical system A by means of the operation of a small-power small-size driving source to move the second lens unit A2 along the optical axis X so that a clear image can be obtained when taking the picture of the object at a near or far distance. Because the auto focus function is performed in the focus adjustable optical system A (i.e., by means of moving the second lens unit along the optical axis to change its relative distance between the first lens unit and the third lens unit), the auto focus function is achieved when the overall focal length of the focus adjustable optical system A remains unchanged, and chromatic aberrations are well corrected.

The aforesaid auto focus optical system A satisfies the following conditions:

$$0<|d1/d2|<0.3$$

in which:
- d1: the distance between the point at the surface of the first lens A11 of the first lens unit A1 facing the image side on the optical axis X and the point at the surface of the second lens A21 of the second lens unit A2 facing the object side on the optical axis X;
- d2: the distance between the point at the surface of the second lens A21 of the second lens unit A2 facing the image side on the optical axis X and the point at the surface of the third lens A31 of the third lens unit A3 facing the object side on the optical axis X.

According to this embodiment, when changing the distance between the focus adjustable optical system A and the object from infinity to close shot, the second lens unit A2 is moved along the optical axis X toward the third lens unit A3 to increase the value of d1 and to simultaneously reduce the value of d2.

Further, the a planar glass A5 may be set between the third lens unit A3 and the image side for filtration and/or protection to fit a different packaging structure for image sensor, providing a better image quality.

Figure 4:
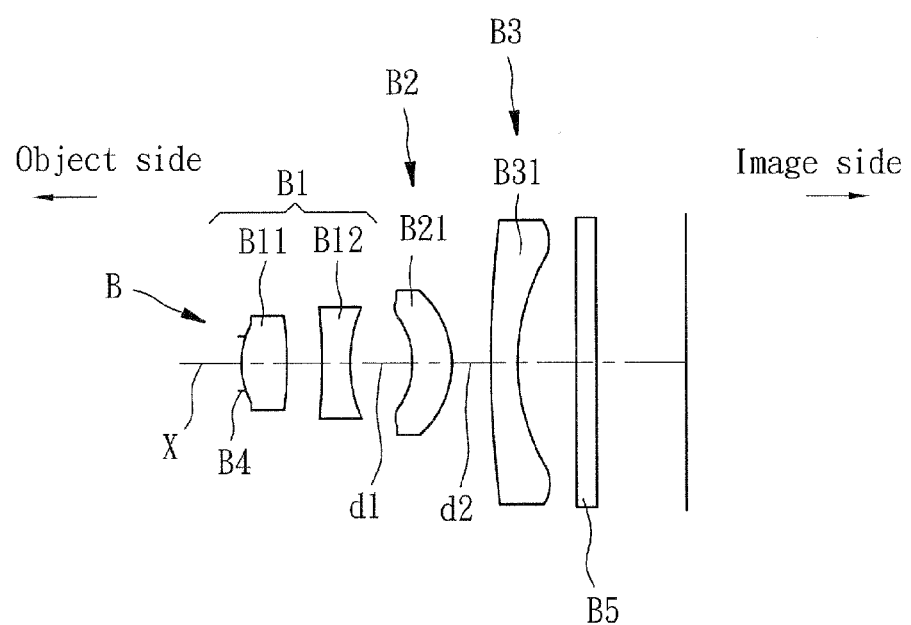
FIG. 4 is a schematic drawing showing the structure of a focus adjustable optical system in accordance with a second embodiment of the present invention.
Figure 5:
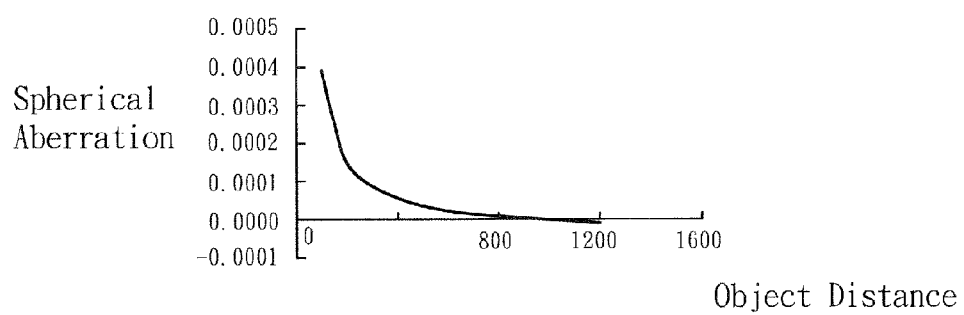
FIG. 5 is a spherical aberration curve obtained from the focus adjustable optical system in accordance with the second embodiment of the present invention.
Figure 6:
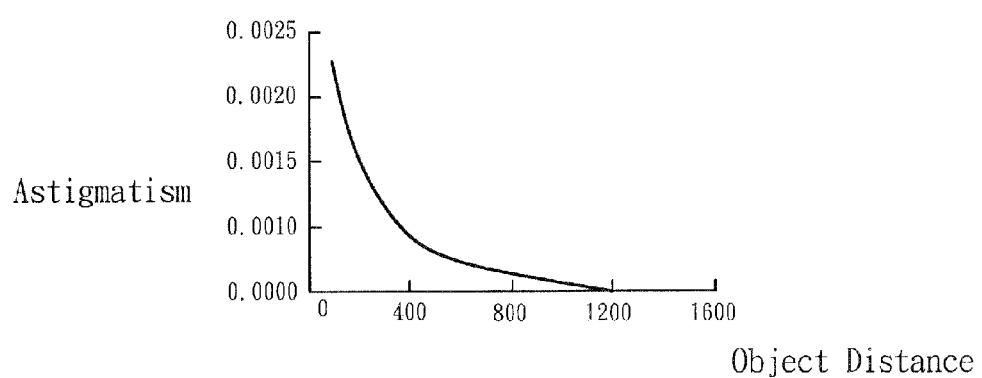
FIG. 6 is an astigmatism curve obtained from the focus adjustable optical system in accordance with the second embodiment of the present invention.

FIG. 4~6 show a focus adjustable optical system B in accordance with a second embodiment of the present invention. The focus adjustable optical system B is comprised of a first lens unit B1, a second lens unit B2, and a third lens unit B3. The first lens unit B1, the second lens unit B2 and the third lens unit B3 are arranged in proper order from the object side to the image side along an optical axis X.

The first lens unit B1 is comprised of a first lens B11 having a positive diopter, and a second lens B12 having a negative diopter. Further, the first lens unit B1 wholly has a positive diopter. The surfaces of the first lens B11 and second lens B21 that face the object side and the image side respectively are all non-spherical surfaces. Further, a diaphragm B4 is provided at the surface of the first lens B11 facing the object side.

The second lens unit B2 is comprised of a third lens B21 having a negative diopter. The surfaces of the second lens A21 that face the object side and the image side respectively are non-spherical surfaces.

The third lens unit B3 is comprised of a fourth lens B31 having a negative diopter. The surfaces of the fourth lens B31 that face the object side and the image side respectively are non-spherical surfaces.

When the object distance is changed from infinity to close shot, an auto focus function is performed in the focus adjustable optical system B by means of the operation of a small-power small-size driving source to move the second lens unit B2 along the optical axis X so that a clear image can be obtained when taking the picture of the object at a near or far distance. Because the auto focus function is performed in the focus adjustable optical system B (i.e., by means of moving the second lens unit along the optical axis to change its relative distance between the first lens unit and the third lens unit), the auto focus function is achieved when the overall focal length of the focus adjustable optical system B remains unchanged, and chromatic aberrations are well corrected.

The aforesaid auto focus optical system B satisfies the following conditions:

$$0<|d1/d2|<5.5$$

in which:
- d1: the distance between the point at the surface of the second lens B12 of the first lens unit B1 facing the image side on the optical axis X and the point at the surface of the third lens B21 of the second lens unit B2 facing the object side on the optical axis X;
- d2: the distance between the point at the surface of the third lens B21 of the second lens unit B2 facing the image side on the optical axis X and the point at the surface of the fourth lens B31 of the third lens unit B3 facing the object side on the optical axis X.

According to this embodiment, when changing the distance between the focus adjustable optical system B and the object from infinity to close shot, the second lens unit B2 is moved along the optical axis X toward the first lens unit B1 to reduce the value of d1 and to simultaneously increase the value of d2.

Further, the a planar glass B5 may be set between the third lens unit B3 and the image side for filtration and/or protection to fit a different packaging structure for image sensor, providing a better image quality.

Figure 7:
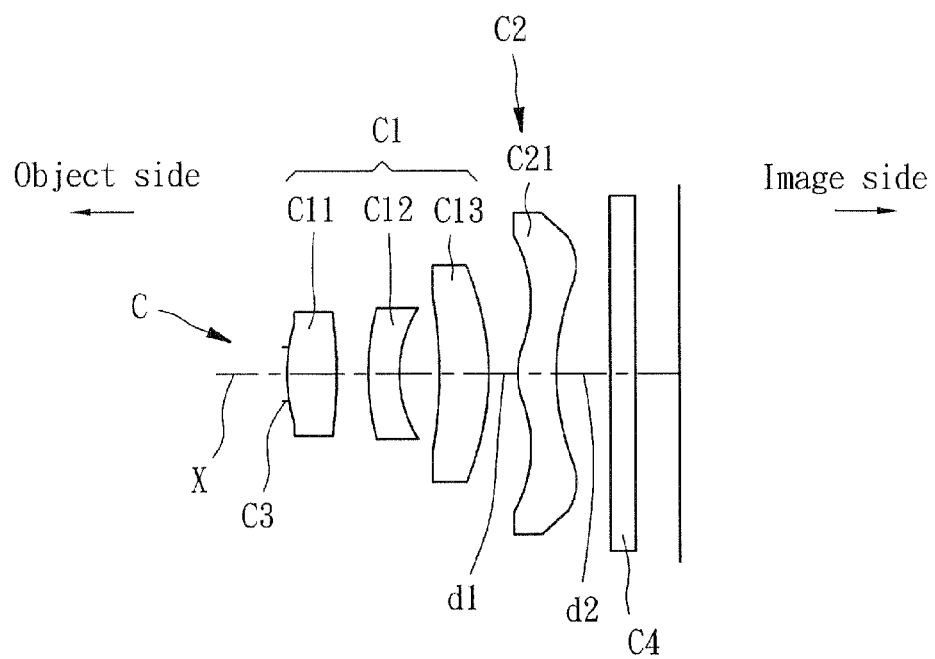
FIG. 7 is a schematic drawing showing the structure of a focus adjustable optical system in accordance with a third embodiment of the present invention.
Figure 8:
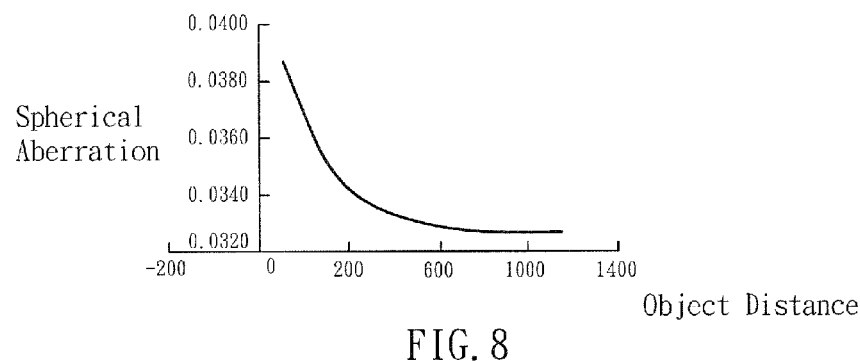
FIG. 8 is a spherical aberration curve obtained from the focus adjustable optical system in accordance with the third embodiment of the present invention.
Figure 9:
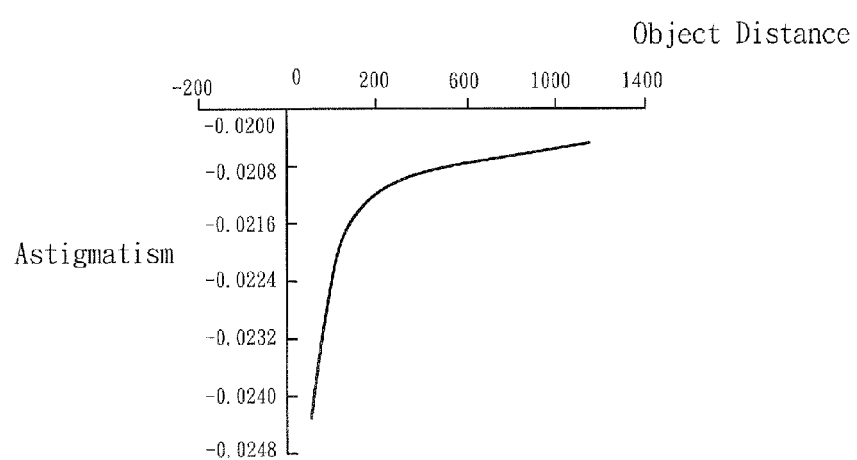
FIG. 9 is an astigmatism curve obtained from the focus adjustable optical system in accordance with the third embodiment of the present invention.

FIGS. 7~9 show a focus adjustable optical system C in accordance with a third embodiment of the present invention. The focus adjustable optical system C is comprised of a first lens unit C1, and a second lens unit C2. The first lens unit C1 and the second lens unit C2 are arranged in proper order from the object side to the image side along an optical axis X.

The first lens unit C1 is comprised of a first lens C11 having a positive diopter, a second lens C12 having a negative diopter, and a third lens C13 having a positive diopter. Further, the first lens unit C1 wholly has a positive diopter. The surfaces of the first lens C11 and second lens C21 and third lens C1 that face the object side and the image side respectively are all non-spherical surfaces. Further, a diaphragm C3 is provided at the surface of the first lens C11 facing the object side.

The second lens unit C2 is comprised of a fourth lens C21 having a negative diopter. The surfaces of the fourth lens C21 that face the object side and the image side respectively are non-spherical surfaces.

When the object distance is changed from infinity to close shot, an auto focus function is performed in the focus adjustable optical system C by means of the operation of a small-power small-size driving source to move the second lens unit C2 along the optical axis X so that a clear image can be obtained when taking the picture of the object at a near or far distance. Because the auto focus is performed in the focus adjustable optical system C (i.e., by means of moving the second lens unit along the optical axis to change its relative distance between the first lens unit and the image side), the auto focus function is achieved when the overall focal length of the focus adjustable optical system C remains unchanged, and chromatic aberrations are well corrected.

The aforesaid auto focus optical system C satisfies the following conditions:

$$0<|d1/d2|<2.1$$

in which:
- d1: The distance between the point at the surface of the third lens C13 of the first lens unit C1 facing the image side on the optical axis X and the point at the surface of the fourth lens C21 of the second lens unit C2 facing the object side on the optical axis X;
- d2: the distance between the point at the surface of the fourth lens C21 of the second lens unit C2 facing the image side on the optical axis X and the point at the image plane on the optical axis X.

According to this embodiment, when changing the distance between the focus adjustable optical system C and the object from infinity to close shot, the second lens unit C2 is moved along the optical axis X toward the first lens unit C1 to increase the value of d1 and to simultaneously reduce the value of d2.

Further, the a planar glass C4 may be set between the second lens unit C2 and the image side to greatly improve the MTF (Modulation Transfer Function) of the focus adjustable optical system C, thereby reducing aberration, distortion, curvature of field and coma.

Figure 10:
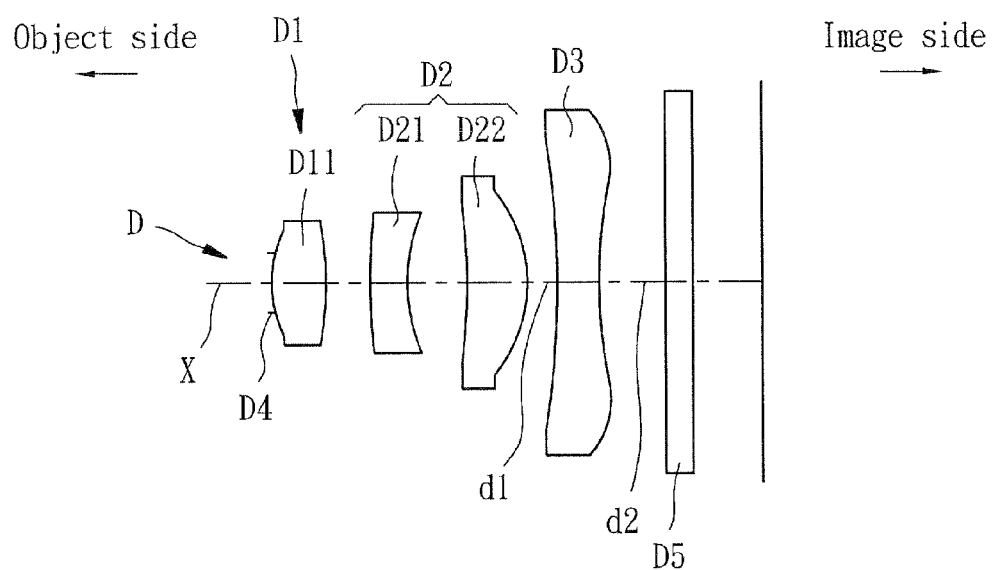
FIG. 10 is a schematic drawing showing the structure of a focus adjustable optical system in accordance with a fourth embodiment of the present invention.
Figure 11:
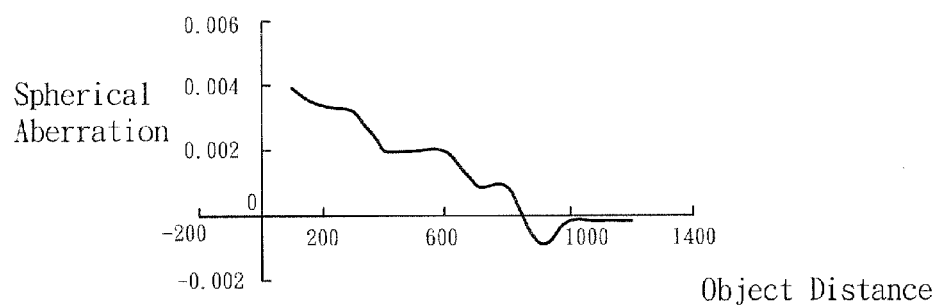
FIG. 11 is a spherical aberration curve obtained from the focus adjustable optical system in accordance with the fourth embodiment of the present invention.
Figure 12:
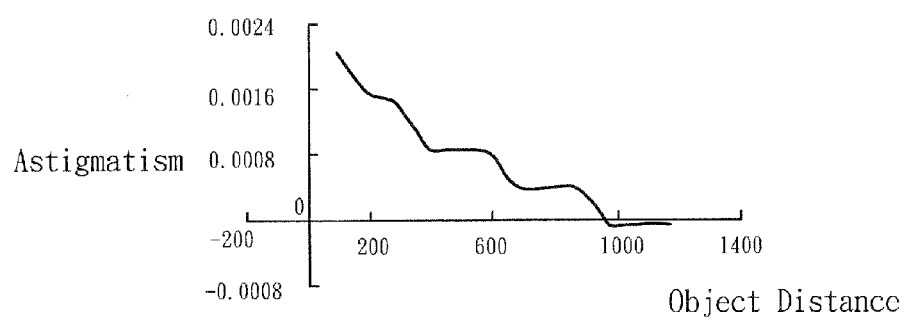
FIG. 12 is an astigmatism curve obtained from the focus adjustable optical system in accordance with the fourth embodiment of the present invention.

FIGS. 10~12 show a focus adjustable optical system D in accordance with a fourth embodiment of the present invention. The focus adjustable optical system D is comprised of a first lens unit D1, a second lens unit D2, and a third lens unit D3. The first lens unit D1, the second lens unit D2 and the third lens unit D3 are arranged in proper order from the object side to the image side along an optical axis X.

The first lens unit D1 is comprised of a first lens D11 having a positive diopter. The surfaces of the first lens D11 that face the object side and the image side respectively are all non-spherical surfaces. Further, a diagram D4 is provided at the surface of the first lens D11 facing the object side.

The second lens unit D2 is comprised of a second lens D21 having a negative diopter, and a third lens D22 having a positive diopter. The second lens unit D2 wholly has a positive diopter. The surfaces of the second lens D21 and third lens D22 that face the object and the image sides respectively are non-spherical surfaces.

The third lens unit D3 is comprised of a fourth lens D31 having a negative diopter. The surfaces of the fourth lens D31 that face the object side and the image side respectively are non-spherical surfaces.

When the object distance is changed from infinity to close shot, an auto focus function is performed in the focus adjustable optical system D by means of the operation of a small-power small-size driving source to move the second lens unit D2 along the optical axis X so that a clear image can be obtained when taking the picture of the object at a near or far distance. Because the auto focus function is performed in the focus adjustable optical system D (i.e., by means of moving the second lens unit along the optical axis to change its relative distance between the first lens unit and the third lens unit), the auto focus function is achieved when the overall focal length of the focus adjustable optical system D remains unchanged, and chromatic aberrations are well corrected.

The aforesaid auto focus optical system D satisfies the following conditions:

$$0<|d1/d2|<65$$

in which:
- d1: the distance between the point at the surface of the first lens D11 of the first lens unit D1 facing the image side on the optical axis X and the point at the surface of the second lens D21 of the second lens unit D2 facing the object side on the optical axis X;
- d2: the distance between the point at the surface of the third lens D22 of the second lens unit D2 facing the image side on the optical axis X and the point at the surface of the fourth lens D31 of the third lens unit D3 facing the object side on the optical axis X.

According to this embodiment, when changing the distance between the focus adjustable optical system D and the object from infinity to close shot, the second lens unit D2 is moved along the optical axis X toward the third lens unit D3 to increase the value of d1 and to simultaneously reduce the value of d2.

Further, the a planar glass D5 may be set between the third lens unit D3 and the image plane for filtration and/or protection to fit a different packaging structure for image sensor, providing a better image quality.

Figure 13:
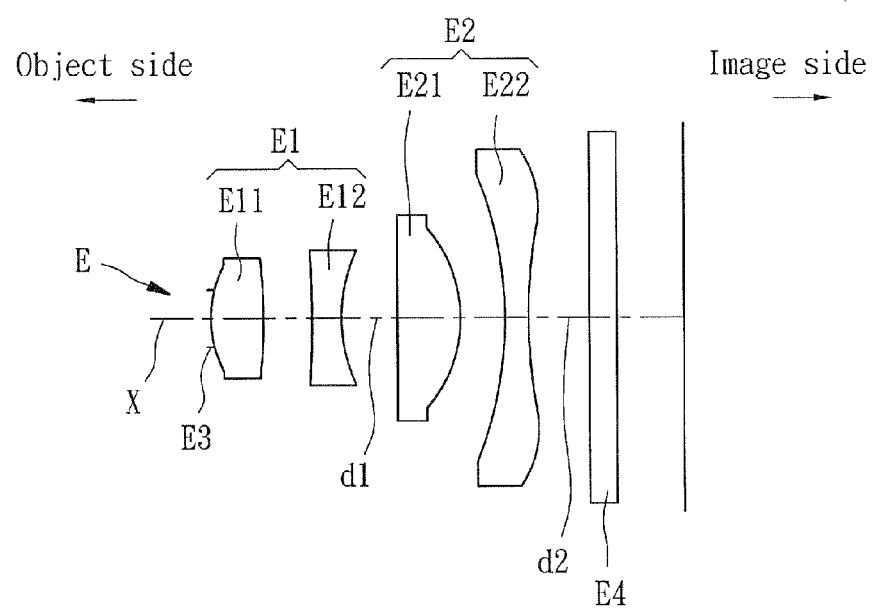
FIG. 13 is a schematic drawing showing the structure of a focus adjustable optical system in accordance with a fifth embodiment of the present invention.
Figure 14:
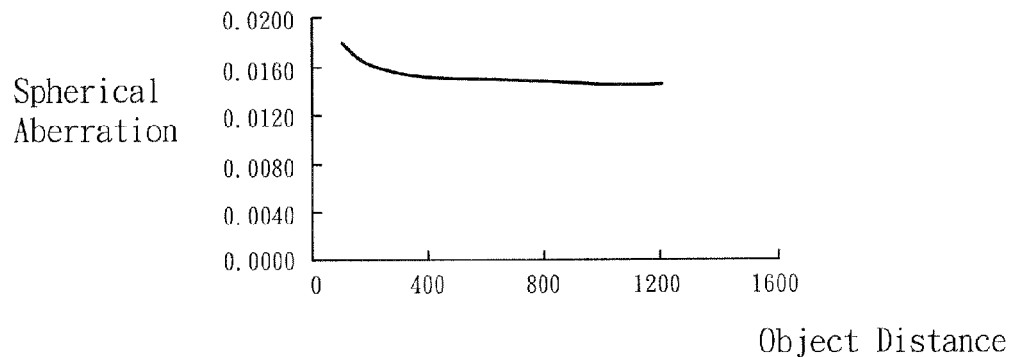
FIG. 14 is a spherical aberration curve obtained from the focus adjustable optical system in accordance with the fifth embodiment of the present invention.
Figure 15:
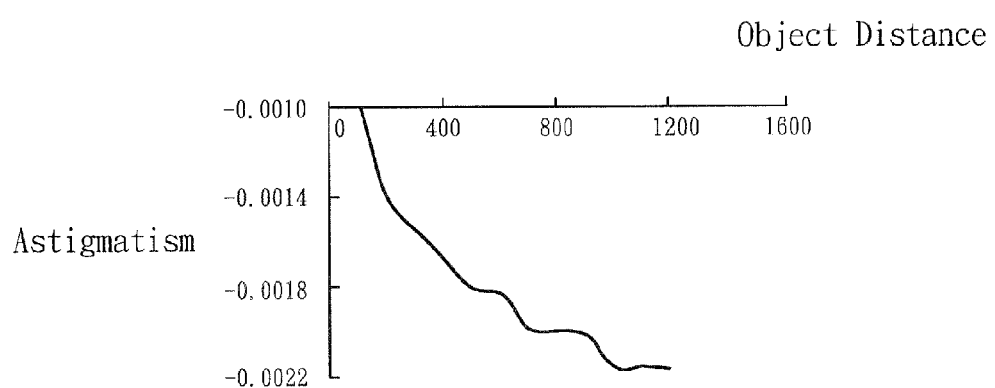
FIG. 15 is an astigmatism curve obtained from the focus adjustable optical system in accordance with the fifth embodiment of the present invention.

FIGS. 13~15 show a focus adjustable optical system E in accordance with a fifth embodiment of the present invention. The focus adjustable optical system E is comprised of a first lens unit E1, and a second lens unit F2. The first lens unit E1 and the second lens unit E2 are arranged in proper order from the object side to the image side along an optical axis X.

The first lens unit E1 is comprised of a first lens E11 having a positive diopter, and a second lens E12 having a negative diopter. Further, the first lens unit E1 wholly has a positive diopter. The surfaces of the first lens E11 and second lens E21 that face the object side and the image side respectively are all non-spherical surfaces. Further, a diaphragm E4 is provided at the surface of the first lens E11 facing the object side.

The second lens unit E2 is comprised of a third lens E21 having a positive diopter and a fourth lens E22 having a negative diopter. Further, the second lens unit E2 wholly has a positive diopter. The surfaces of the third lens E21 and fourth lens E221 that face the object and the image sides respectively are non-spherical surfaces.

When the object distance is changed from infinity to close shot, an auto focus function is performed in the focus adjustable optical system E by means of the operation of a smaller-power small-size driving source to move the second lens unit E2 along the optical axis X so that a clear image can be obtained when taking the picture of the object at a near or far distance. Because the auto focus function is performed in the focus adjustable optical system E (i.e., by means of moving the second lens unit along the optical axis to change it relative distance between the first lens unit and the image side), the auto focus function is achieved when the overall focal length of the focus adjustable optical system E remains unchanged, and chromatic aberrations are well corrected.

The aforesaid auto focus optical system E satisfies the following conditions:

$$0<|d1/d2|<0.15$$

in which:
   d1: the distance between the point at the surface of the second lens E12 of the first lens unit E1 facing the image side on the optical axis X and the point at the surface of the third lens E21 of the second lens unit E2 facing the object side on the optical axis X;
   d2: the distance between the point at the surface of the fourth lens E22 of the second lens unit E2 facing the image side on the optical axis X and the point at the image plane of the optical axis X.

According to this embodiment, when changing the distance between the focus adjustable optical system E and the object from infinity to close shot, the second lens unit E2 is moved along the optical axis X toward the first lens unit E1 to reduce the value of d1 and to simultaneously increase the value of d2.

Further, the a planar glass E4 may be set between the second lens unit E2 and the image plane for filtration and/or protection to fit a different packaging structure for image sensor, providing a better image quality.

Figure 16:
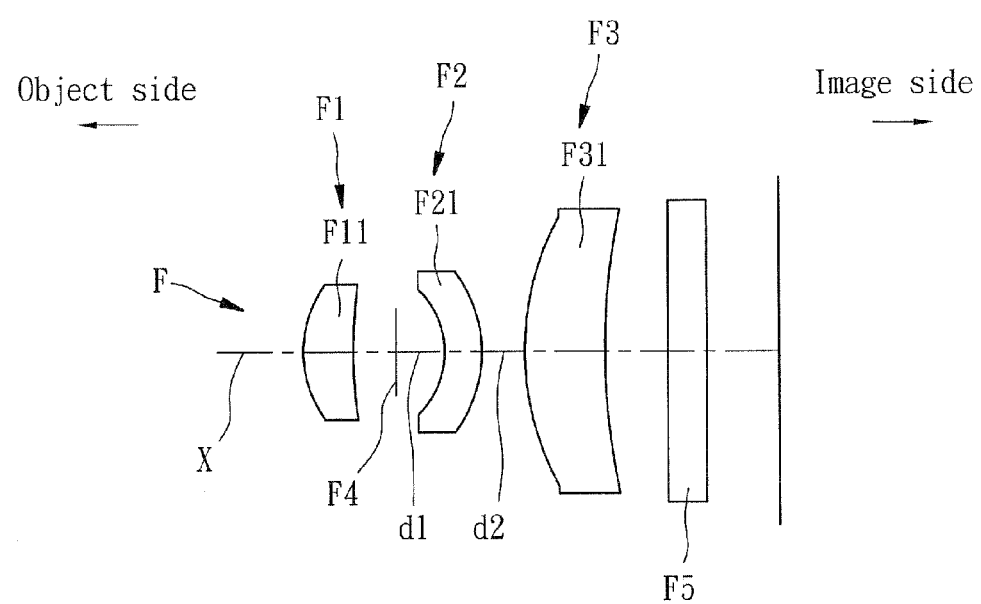
FIG. 16 is a schematic drawing showing the structure of a focus adjustable optical system in accordance with a sixth embodiment of the present invention.
Figure 17:
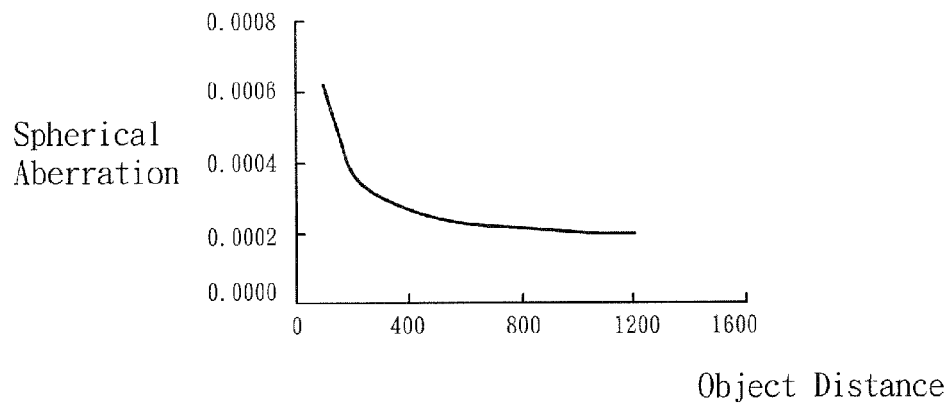
FIG. 17 is a spherical aberration curve obtained from the focus adjustable optical system in accordance with the sixth embodiment of the present invention.
Figure 18:
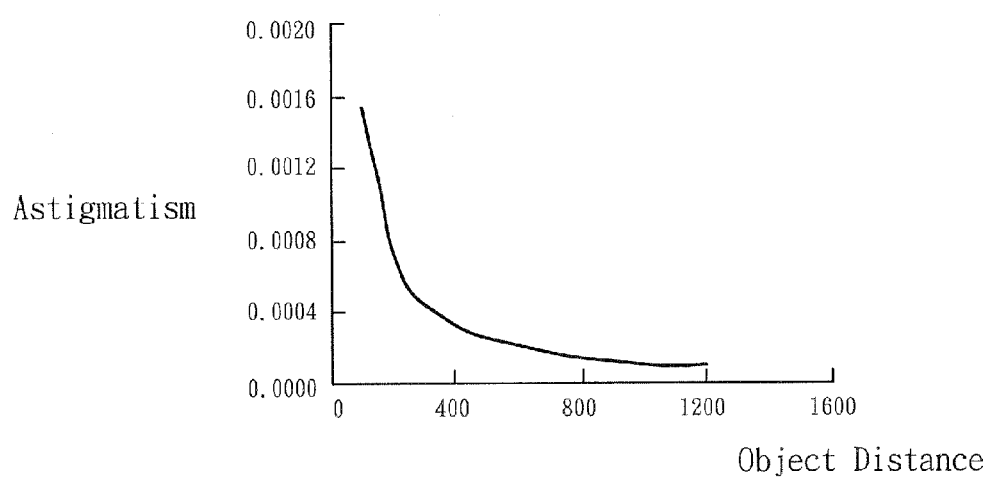
FIG. 18 is an astigmatism curve obtained from the focus adjustable optical system in accordance with the sixth embodiment of the present invention.

FIGS. 16~18 show a focus adjustable optical system F in accordance with a sixth embodiment of the present invention. The focus adjustable optical system F is comprised of a first lens unit F1, a second lens unit F2, a third lens unit F3, and a diaphragm F4. The first lens unit F1, the second lens unit F2 and the third lens unit F3 are arranged in proper order from the object side to the image side along an optical axis X.

The first lens unit F1 is comprised of a first lens F1 having a positive diopter. The surfaces of the first lens F11 that face the object and the image sides respectively are all non-spherical surfaces.

Further, the diaphragm F4 is spaced between the first lens unit F1 and the second lens unit F2.

The second lens unit F2 is comprised of a second lens F21 having a negative diopter. The surfaces of the second lens F21 that face the object and the image sides respectively are non-spherical surfaces.

The third lens unit F3 is comprised of a third lens F31 having a negative diopter. The surfaces of the third lens F31 that face the object and the image sides respectively are non-spherical surfaces.

When the object distance is changed from infinity to close shot, an auto focus function is performed in the focus adjustable optical system F by means of the operation of a small-power small-size driving source to move the second lens unit F2 along the optical axis X so that a clear image can be obtained when taking the picture of the object at a near or face distance. Because the auto focus function is performed in the focus adjustable optical system F (i.e., by means of moving the second lens unit along the optical axis to change its relative distance between the first lens unit and the third lens unit), the auto focus function is achieved when the overall focal length of the focus adjustable optical system F remains unchanged, and chromatic aberrations are well corrected.

The aforesaid auto focus optical system F satisfies the following conditions:

$$0<|d1/d2|<2.5$$

in which:
   d1: the distance between the point at the surface of the first lens F11 of the first lens unit F1 facing the image side on the optical axis X and the point at the surface of the second lens F21 of the second lens unit F2 facing the object side on the optical axis X:
   d2: the distance between the point at the surface of the second lens F21 of the second lens unit F2 facing the image side on the optical axis X and the point at the surface of the third lens F31 of the third lens unit F3 facing the object side on the optical axis X.

According to this embodiment, when changing the distance between the focus adjustable optical system F and the object from infinity to close shot, the second lens unit F2 is moved along the optical axis X toward the first lens unit F1 to reduce the value of d1 and to simultaneously increase the value of d2.

Further, the a planar glass F5 may be set between the third lens unit F3 and the image plane for filtration and/or protection to fit a different packaging structure for image sensor, providing a better image quality.

Figure 19:
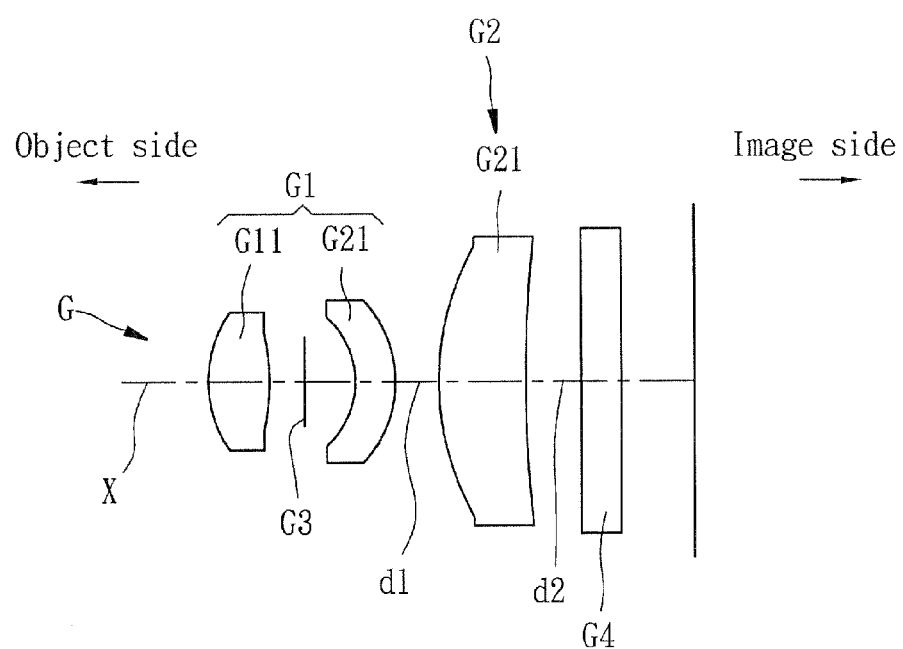
FIG. 19 is a schematic drawing showing the structure of a focus adjustable optical system in accordance with a seventh embodiment of the present invention.
Figure 20:
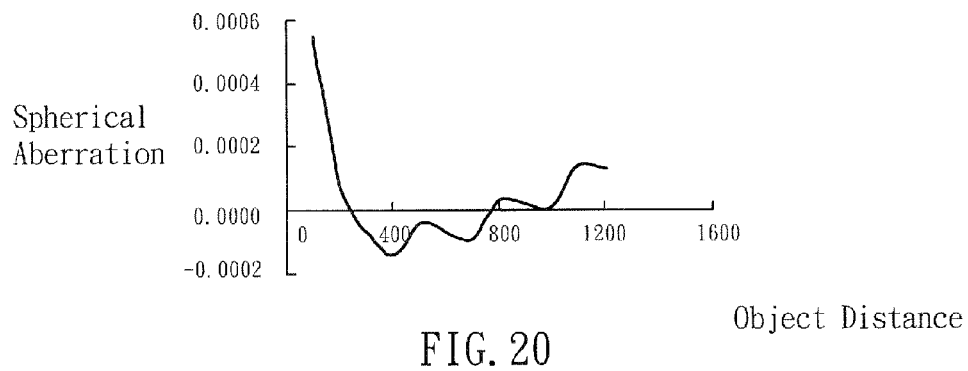
FIG. 20 is a spherical aberration curve obtained from the focus adjustable optical system in accordance with the seventh embodiment of the present invention.
Figure 21:
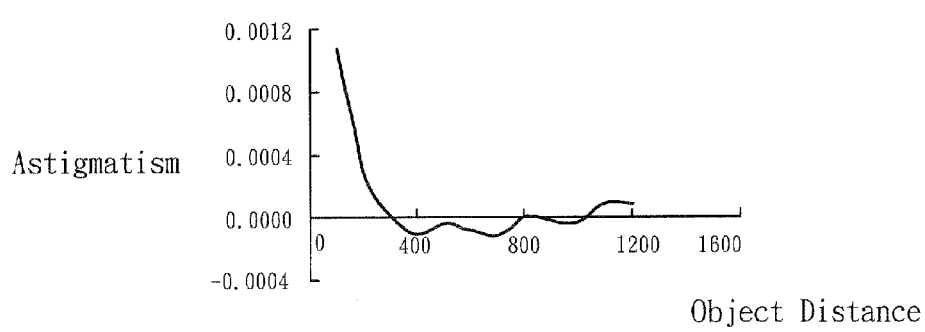
FIG. 21 is an astigmatism curve obtained from the focus adjustable optical system in accordance with the seventh embodiment of the present invention.

FIGS. 19~21 show a focus adjustable optical system G in accordance with a seventh embodiment of the present invention. The focus adjustable optical system G is comprised of a first lens unit G1, a second lens unit G2, and a diaphragm G3. The first lens unit G1 and the second lens unit G2 and the diaphragm G3 are arranged in proper order from the object side to the image side along an optical axis X.

The first lens unit G1 is comprised of a first lens G11 having a positive diopter, and a second lens G12 having a negative diopter. Further, the first lens unit G1 wholly has a positive diopter. The surfaces of the first lens G11 and second lens G21 and third lens G1 that face the object and the image sides respectively are all non-spherical surfaces.

The diaphragm G3 is spaced between the first lens unit G1 and the second lens unit G2.

The second lens unit G2 is comprised of a third lens G21 having a positive diopter. The surfaces of the third lens G21 that face the object and the image sides respectively are non-spherical surfaces.

When the object distance is changed from infinity to close shot, an auto focus function is performed in the focus adjustable optical system G by means of the operation of a small-power small-size driving source to move the second lens unit G2 along the optical axis X so that a clear image can be obtained when taking the picture of the object at a near or far distance. Because the auto focus function is performed in the focus adjustable optical system G (i.e., by means of moving the second lens unit along the optical axis to change its relative distance between the first lens unit and the image side), the auto focus function is achieved when the overall focal length of the focus adjustable optical system G remains unchanged, and chromatic aberrations are well corrected.

The aforesaid auto focus optical system G satisfies the following conditions:

$$0<|d1/d2|<0.1$$

in which:
- d1: the distance between the point at the surface of the second less G12 of the first lens unit G1 facing the image side on the optical axis X and the point at the surface of the third lens G21 of the second lens unit G2 facing the object side on the optical axis X;
- d2: the distance between the point at the surface of the third lens G21 of the second lens unit G2 facing the image side on the optical axis X and the point at image plane of the optical axis X.

According to this embodiment, when changing the distance between the focus adjustable optical system G and the object from infinity to close shot, the second lens unit G2 is moved along the optical axis X toward the image side to increase the value of d1 and to simultaneously reduce the value of d2.

Further, the a planar glass G4 may be set between the second lens unit G2 and the image side for filtration and/or protection to fit a different packaging structure for image sensor, providing a better image quality.

Figure 22:
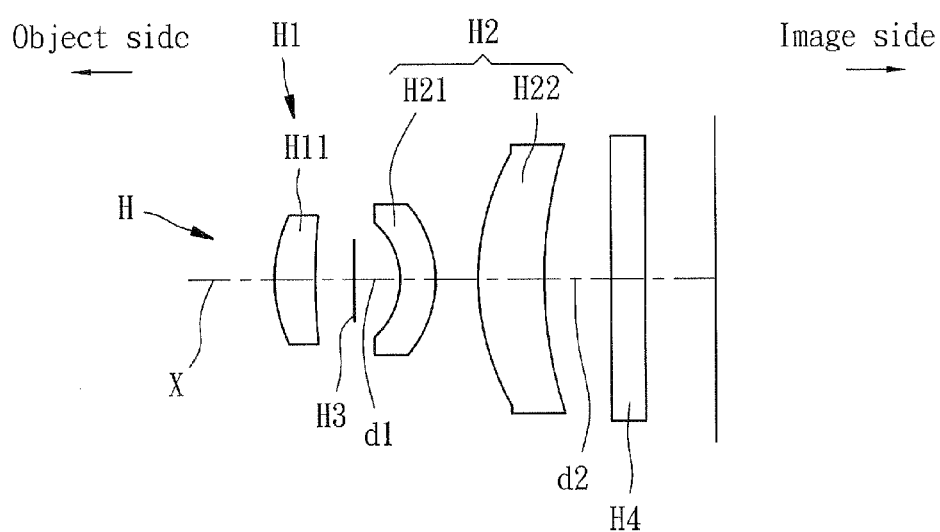
FIG. 22 is a schematic drawing showing the structure of a focus adjustable optical system in accordance with an eighth embodiment of the present invention.
Figure 23:
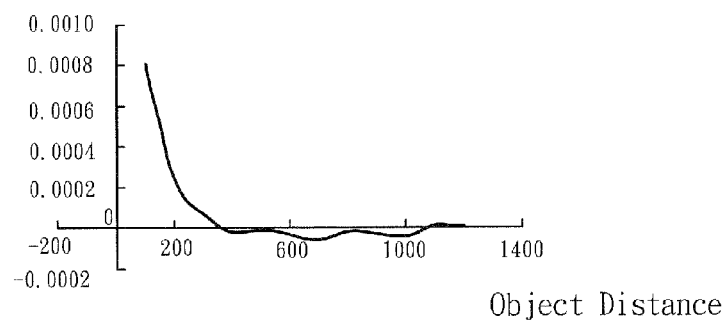
FIG. 23 is a spherical aberration curve obtained from the focus adjustable optical system in accordance with the eighth embodiment of the present invention.
Figure 24:
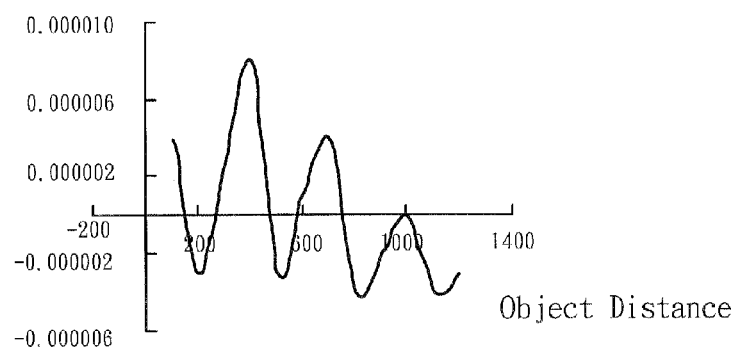
FIG. 24 is an astigmatism curve obtained from the focus adjustable optical system in accordance with the eighth embodiment of the present invention.

FIGS. 22~24 show a focus adjustable optical system H in accordance with an eighth embodiment of the present invention. The focus adjustable optical system H is comprised of a first lens unit H1, a second lens unit H2, and a diaphragm H3. The first lens unit H1 and the second lens unit H2 and the diaphragm H3 are arranged in proper order from the object side to the image side along an optical axis X.

The first lens unit H1 is comprised of a first lens H11 having a positive diopter. The surfaces of the first lens H11 of the first lens unit H1 that face the object and the image sides respectively are all non-spherical surfaces.

The diaphragm H3 is spaced between the first lens unit H1 and the second lens unit GH2.

The second lens unit H2 is comprised of a second lens H21 having a negative diopter, and a third lens H22 having a positive diopter. Further, the second lens unit H2 wholly has a positive diopter. The surfaces of the second lens H21 and third lens H22 that face the object and the image sides respectively are non-spherical surfaces.

When the object distance is changed from infinity to close shot, an auto focus function is performed in the focus adjustable optical system HG by means of the operation of a small-power small-size driving source to move the second lens unit H2 along the optical axis X so that a clear image can be obtained when taken the picture of the object at a near or far distance. Because the auto focus function is performed in the focus adjustable optical system H (i.e., by means of moving the second lens unit along the optical axis to change its relative distance between the first lens unit and the image side), the auto focus function is achieved when the overall focal length of the focus adjustable optical system H remains unchanged, and chromatic aberrations are well corrected.

The aforesaid auto focus optical system H satisfies the following conditions:

$$0<|d1/d2|<4.2$$

in which:
- d1: the distance between the point at the surface of the first lens H11 of the first lens unit H1 facing the image side on the optical axis X and the point at the surface of the second lens H21 of the second lens unit H2 facing the object side on the optical axis X;
- d2: the distance between the point at the surface of the third lens H22 of the second lens unit H2 facing the image side on the optical axis X and the point at the image plane on the optical axis X.

According to this embodiment, when changing the distance between the focus adjustable optical system H and the object from infinity to close shot, the second lens unit H2 is moved along the optical axis X toward the object side to reduce the value of d1 and to simultaneously increase the value of d2.

Further, the a planar glass H4 may be set between the second lens unit H2 and the image side for filtration and/or protection to fit a different packaging structure for image sensor, providing a better image quality.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A focus adjustable optical system arranged on an optical axis between an object side and an image side, comprising:
   a first lens unit, said first lens unit comprising at least one lens set on said optical axis, and defining a fixed distance from said lens to the image plane on the optical axis;
   a second lens unit spaced between said first lens unit and the image plane, said second lens unit comprising at least one lens movable along said optical axis to change the distance between the at least one lens of said second lens and the image plane;
   a third lens unit spaced between said second lens unit and the image plane, said third lens unit comprising at least one lens that defines with the image plane a fixed distance;
   wherein said first lens unit is comprised of a first lens having a positive diopter and a second lens having a negative diopter, said first lens and said second lens being arranged along said optical axis in direction from said object side to said second lens unit; said first lens unit wholly has a positive diopter; said second lens unit is comprised of a third lens having a positive diopter; said third lens unit is comprised of a fourth lens having a negative diopter; and
   wherein said focus adjustable optical system further comprising a diaphragm arranged on said optical axis before the object-side lens surface of said first lens.

2. A focus adjustable optical system arranged on an optical axis between an object side and an image side, comprising:
   a first lens unit, said first lens unit comprising at least one lens set on said optical axis, and defining a fixed distance from said lens to the image plane on the optical axis;
   a second lens unit spaced between said first lens unit and the image plane, said second lens unit comprising at least one lens movable along said optical axis to change the distance between the at least one lens of said second lens and the image plane;
   a third lens unit spaced between said second lens unit and the image plane, said third lens unit comprising at least one lens that defines with the image plane a fixed distance;
   wherein said first lens unit is comprised of a first lens having a positive diopter and a second lens having a negative diopter, said first lens and said second lens being arranged along said optical axis in direction from said object side to said second lens unit; said first lens unit wholly has a positive diopter; said second lens unit is comprised of a third lens having a positive diopter; said third lens unit is comprised of a fourth lens having a negative diopter; and wherein said focus adjustable optical system further comprising a diaphragm arranged on said optical axis at the surface of said first lens facing said object side.

3. A focus adjustable optical system, arranged on an optical axis between an object side and an image side, comprising:

a first lens unit, said first lens unit comprising at least one lens set on said optical axis, and defining a fixed distance from said lens to the image plane on the optical axis;

a second lens unit spaced between said first lens unit and the image plane, said second lens unit comprising at least one lens movable along said optical axis to change the distance between the at least one lens of said second lens and the image plane;

a third lens unit spaced between said second lens unit and the image plane, said third lens unit comprising at least one lens that defines with the image plane a fixed distance;

wherein said first lens unit is comprised of a first lens having a positive diopter and a second lens having a negative diopter, said first lens and said second lens being arranged along said optical axis in direction from said object side to said second lens unit; said first lens unit wholly has a positive diopter; said second lens unit is comprised of a third lens having a positive diopter; said third lens unit is comprised of a fourth lens having a negative diopter and wherein said focus adjustable optical system further comprising a diaphragm arranged on said optical axis between said first lens and said second lens.

4. A focus adjustable optical system, arranged on an optical axis between an object side and an image side, comprising:

a first lens unit, said first lens unit comprising at least one lens set on said optical axis, and defining a fixed distance from said lens to the image plane on the optical axis;

a second lens unit spaced between said first lens unit and the image plane, said second lens unit comprising at last one lens movable along said optical axis to change the distance between the at least one lens of said second lens and the image plane;

a third lens unit spaced between said second lens unit and the image plane, said third lens unit comprising at least one lens that defines with the image plane a fixed distance; and wherein said first lens unit is comprised of a first lens having a positive diopter; said second lens unit is comprised of a second lens having a negative diopter and a third lens having a positive diopter, said second lens and said third lens being arranged on said optical axis in direction from said first lens unit to said image side; said second lens unit wholly has a positive diopter; said third lens unit is comprised of a fourth lens having a negative diopter;

said focus adjustable optical system further comprising a diaphragm arranged on said optical axis before the object-side lens surface of said first lens.

5. A focus adjustable optical system,
arranged on an optical axis between an object side and an image side, comprising:

a first lens unit, said first lens unit comprising at least one lens set on said optical axis, and defining a fixed distance from said lens to the image plane on the optical axis;

a second lens unit spaced between said first lens unit and the image plane, said second lens unit comprising at least one lens movable along said optical axis to change the distance between the at least one lens of said second lens and the image plane; and a third lens unit spaced between said second lens unit and the image plane, said third lens unit comprising at least one lens that defines with the image plane a fixed distance; and wherein said first lens unit is comprised of a first lens having a positive diopter; said second lens unit is comprised of a second lens having a negative diopter and a third lens having a positive diopter, said second lens and said third lens being arranged on said optical axis in direction from said first lens unit to said image side; said second lens unit wholly has a positive diopter; said third lens unit is comprised of a fourth lens having a negative diopter;

said focus adjustable optical system further comprising a diaphragm arranged on said optical axis at the surface of said first lens facing said object side.

6. The focus adjustable optical system as claimed in claim 5, which satisfies the conditions of $0<|d1/d2|<65$, in which:

d1: the distance between the point at the surface of said first lens facing said image side on said optical axis and the point at the surface of said second lens facing said object side on said optical axis;

d2: the distance between the point at the surface of said third lens facing said image side on said optical axis and the point at said fourth lens facing said object side on said optical axis.

7. The focus adjustable optical system as claimed in claim 1, wherein surfaces of each of at least one lens of said first lens unit, said second lens unit, or said third lens unit that face said object and said image sides respectively are non-spherical surfaces.

8. The focus adjustable optical system as claimed in claim 2, wherein surfaces of each of at least one lens of said first lens unit, said second lens unit, or said third lens unit that face said object and said image sides respectively are non-spherical surfaces.

9. The focus adjustable optical system as claimed in claim 3, wherein surfaces of each of at least one lens of said first lens unit, said second lens unit, or said third lens unit that face said object and said image sides respectively are non-spherical surfaces.

10. The focus adjustable optical system as claimed in claim 5, wherein satisfies the condition of $0<|d1/d2|<65$, in which:

d1: the distance between the point at the surface of said first lens facing said image side on said optical axis and the point at the surface of said second lens facing said object side on said optical axis;

d2: the distance between the point at the surface of said third lens facing said image side on said optical axis and the point at said fourth lens facing said object side on said optical axis.

* * * * *